United States Patent [19]

Treff et al.

[11] Patent Number: 4,832,283
[45] Date of Patent: May 23, 1989

[54] TAPE TRANSPORT CARTRIDGE

[75] Inventors: Arthur J. Treff, East Hartford; Donald R. Spaman, Middletown, both of Conn.

[73] Assignee: Raymond Engineering Inc., Middletown, Conn.

[21] Appl. No.: 185,441

[22] Filed: Apr. 25, 1988

Related U.S. Application Data

[63] Continuation of Ser. No. 21,223, Mar. 3, 1987, abandoned.

[51] Int. Cl.$^4$ ............................................. G11B 15/26
[52] U.S. Cl. .................................................... 242/192
[58] Field of Search ............... 242/192, 197, 198, 202, 242/75, 75.1; 360/90, 93, 96.3, 96.4, 132

[56] References Cited

U.S. PATENT DOCUMENTS

4,162,774  7/1979  Bowers ............................... 242/192
4,455,001  6/1984  Schilke et al. ....................... 242/192

Primary Examiner—David Werner
Attorney, Agent, or Firm—Fishman, Dionne & Cantor

[57] ABSTRACT

A tape transport cartridge is presented having a pair of brakes for the drive belt, the brakes being positioned to increase the angle of separation of the drive belt from the magnetic tape. This increased angle of separation results in improved drive of the tape, and the dual brake arrangement also establishes a more nearly constant instantaneous velocity differential for the tape packs, resulting in a lower and more constant tape tension.

21 Claims, 7 Drawing Sheets

(PRIOR ART)

FIG. 7

TAPE TRANSPORT CARTRIDGE

This application is a continuation of application Ser. No. 024,223 filed Mar. 3, 1987, now abandoned.

BACKGROUND OF THE INVENTION

The present invention relates to tape transports and particularly to apparatus for causing movement of a magnetic recording tape relative to a recording and/or playback head. More specifically, this invention is directed to an improved tape drive system in which the tension imposed on the tape is a lower average tension and more uniform tension from beginning of tape (BOT) to end of tape (EOT).

Tape transport mechanisms are, of course, well known in the art. Tape transports of the same general type as that to which the present invention is directed are exemplified by the apparatus disclosed in U.S. Pat. Nos. 3,620,473, 3,974,982 and 4,455,001 which are assigned to the assignee of the present invention. A tape transport will typically include a tape handling mechanism, a magnetic tape on which a program may be stored, a read/write head and a drive motor. One type of tape drive system employs a peripheral drive belt to drive the tape packs. The belt is arranged to run in a path which contacts the tape packs, and the belt is driven by a capstan. A typical peripheral belt drive system may have a spring loaded idler to apply tension to the drive belt and a brake to establish a differential rotational velocity of the tape to establish a necessary tape tension to maintain the tape in contact with the read/write head and avoid tape spillage.

A particular problem with the prior art relates to the absolute levels of tape tension and the average tape tension from BOT to EOT. However, in practice, the tape tension increases significantly at the beginning of the tape and at the end of the tape, and the average tape tension is higher than the desired constant level The high tension levels at BOT and EOT cause stresses which, in severe cases, can distort the tape. Moreover, the increased average tape tension results in wear of the tape and the read/write head, wastes power in that more input power is required to drive the unit, and generally results in less than ideal transfer of tape from reel to reel.

SUMMARY OF THE INVENTION

The above discussed problems of the prior art are overcome or reduced by the present invention, wherein a pair of rotary brakes are incorporated in the peripheral belt drive system. The dual rotary brakes are positioned adjacent the tape packs and are positioned so as to increase the separation between the drive belt and the tape in the vicinity where the tape is exiting or joining the tape pack and to increase the angle of contact between the drive belt and the tape pack. As a result, contact between the drive belt and tape is reduced in the vicinity where the tape is exiting or joining the tape pack, and contact between the drive belt and the tape pack is concentrated in the location of maximum interlayer pressure of the tape. This results in a system having the significant improvements and advantages of this invention over the prior art.

BRIEF DESCRIPTION OF THE DRAWINGS

Referring now the drawings, wherein like elements are numbered alike in the several FIGURES.

DESCRIPTION OF THE PREFERRED EMBODIMENT

Figure 1:
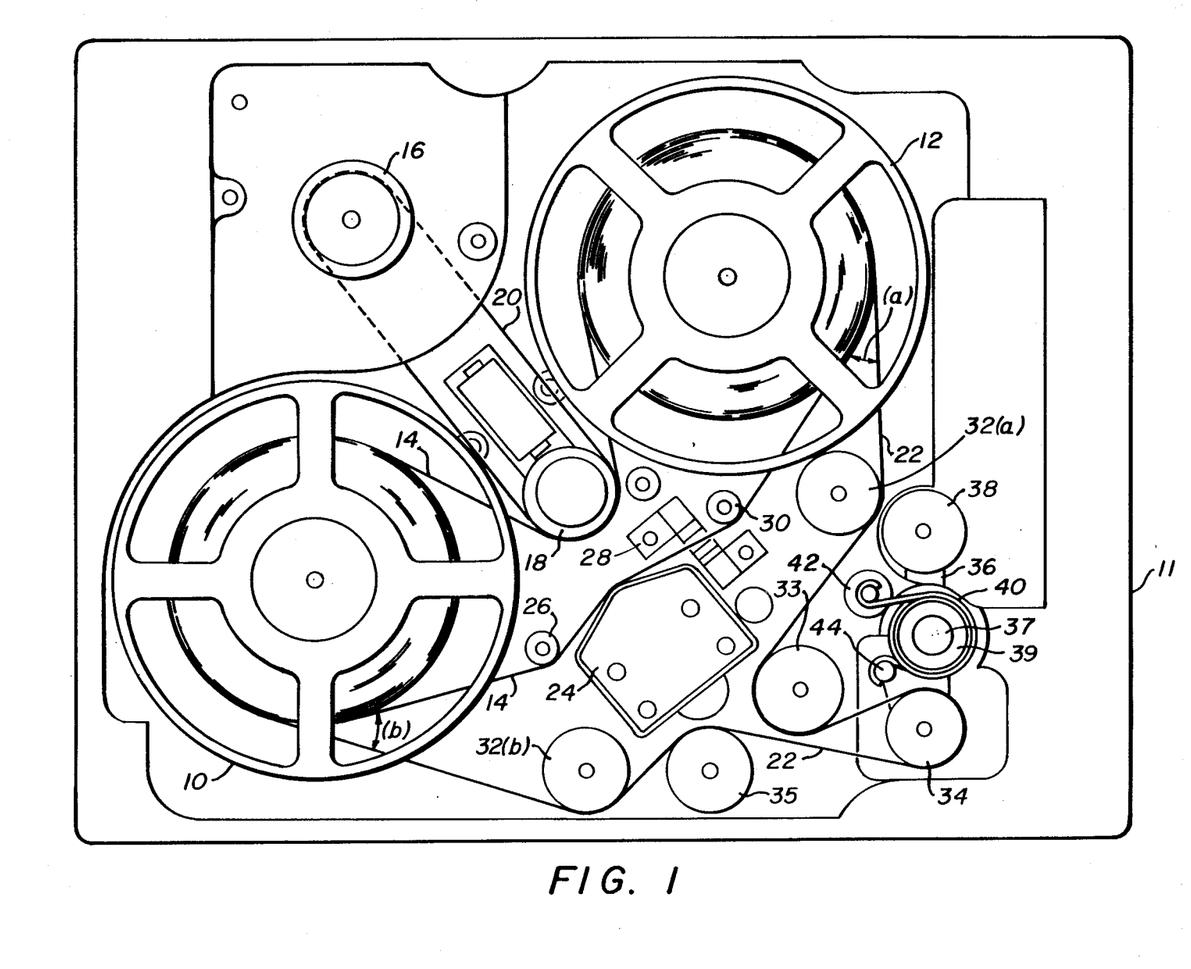
FIG. 1 is a top plan view of a dual brake tape transport in accordance with a preferred embodiment of the present invention.
Figure 2:
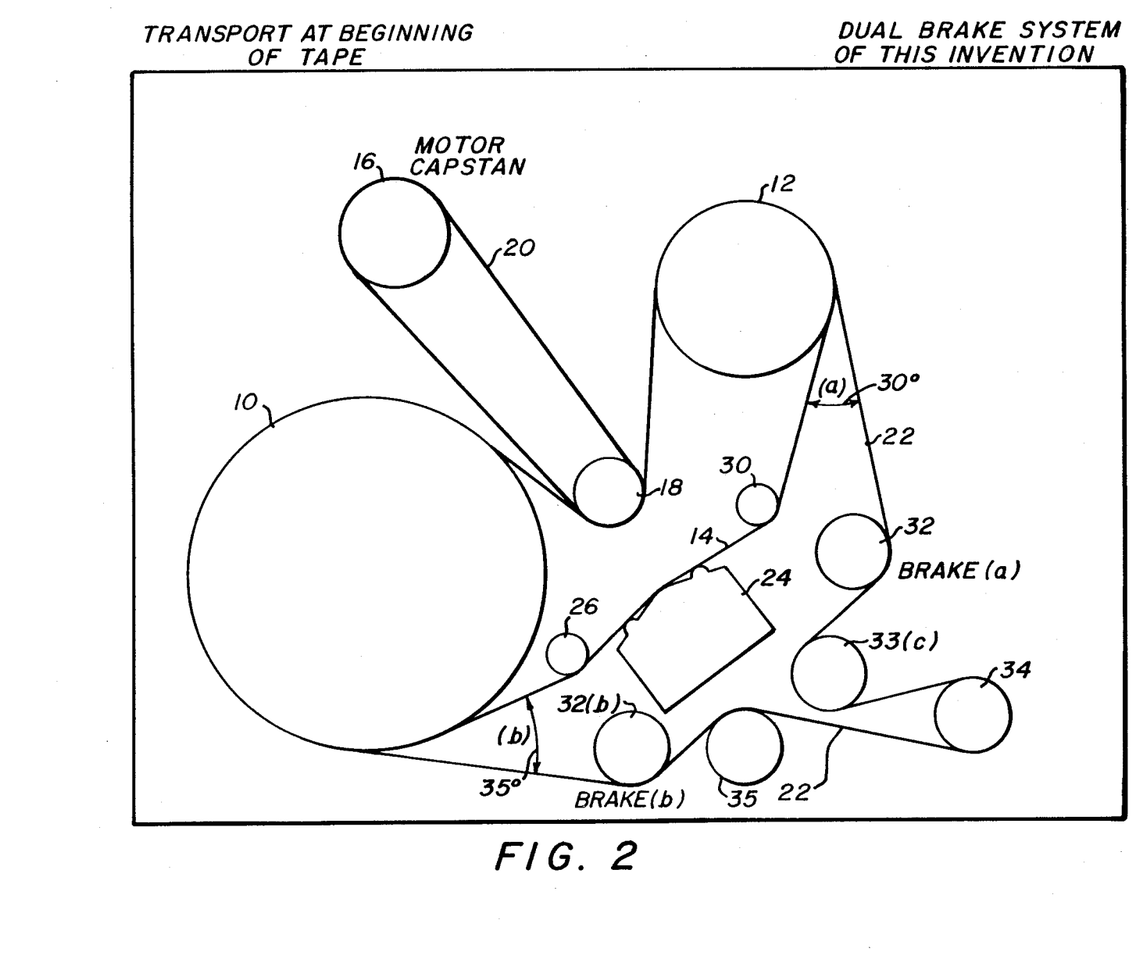
FIG. 2 is a schematic representation of the tape transport of FIG. 1 at a beginning of tape mode.
Figure 3:
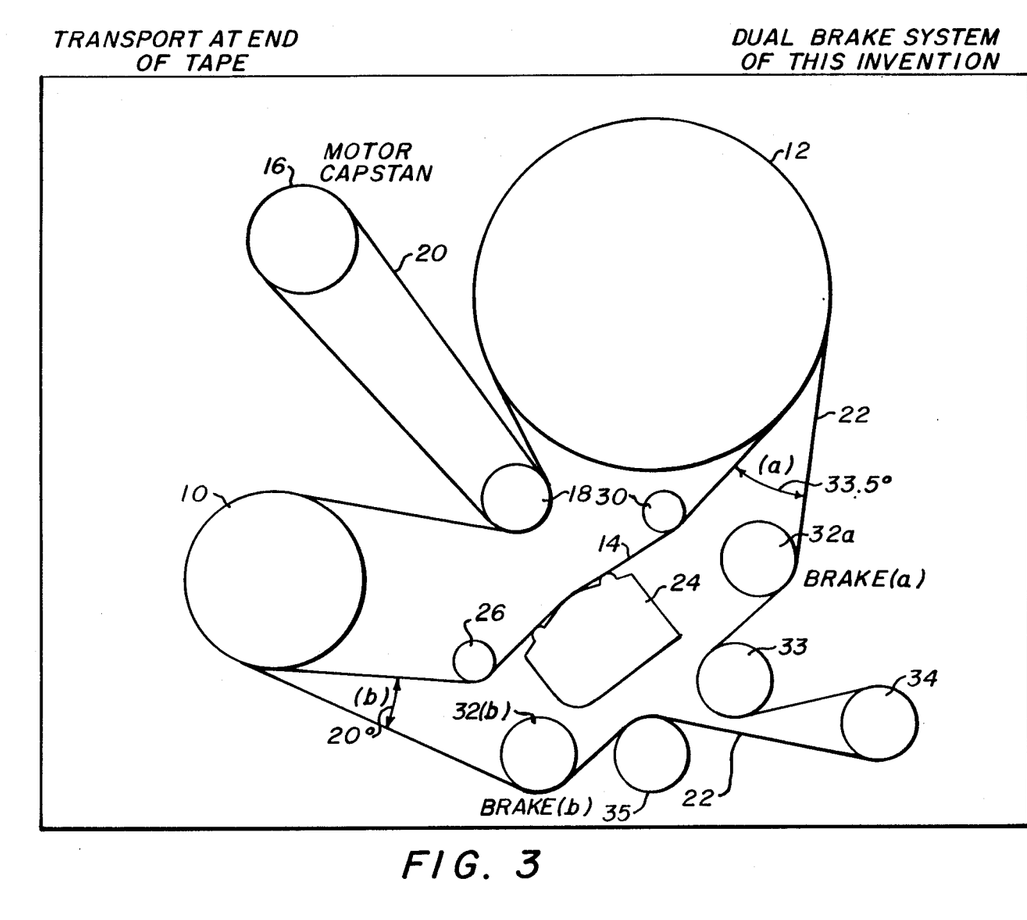
FIG. 3 is a schematic representation of the tape transport of FIG. 1 at an end of tape mode.

Referring jointly to FIGS. 1, 2 and 3, a tape transport unit in accordance with a preferred embodiment of the present invention is shown, FIG. 2 schematically diagramming the path of the recording tape and the drive belts. In the tape transport of FIGS. 1, 2 and 3, the recording tape is contained in two reels 10 and 12 rotatably mounted on a cartridge base 11. Depending on the direction of tape motion, one reel will function as a supply reel while the other reel acts as a take-up reel. Each of reels 10 and 12 is affixed to a precision ball bearing mounted shaft which permits reel rotation. In accordance with the present invention, no drive or braking power is transmitted to either of the reels via the free turning reel shafts.

The tape transport of FIGS. 1, 2 and 3 includes, in addition to the reels 10 and 12, a magnetic tape 14 which is transferred between the reels, a drive motor 16 and a rotatable capstan 18 mounted on cartridge body 11 and a drive belt 20 which couples motor 16 to capstan 18 whereby the motor will drive the capstan. The tape transport also includes a peripheral belt 22 which extends over capstan 18 and about the periphery of the tape packs on reels 10 and 12 as may best be seen from FIG. 2 The tape transport also includes a read/write head 24 over which tape 14 passes and contacts.

The path for the recording tape 14, assuming that reel 10 is functioning as the supply reel and reel 12 is functioning as the take up reel in the forward direction of operation, is from the periphery of reel 10 across a first tape guide 26, then across the working gap of the head assembly 24, then through a photoelectric beginning of tape (BOT) end of tape (EOT) sensor which has been indicated generally at 28, then across a second tape guide 30 and into the periphery of the tape pack on take-up reel 12 It should be noted that the only transport element which contacts the tape oxide surface outside of the tape packs is the working gap surface of the read/write head 24. The back side of the tape, rather than the oxide surface, will contact the tape guides 26 and 30. The absence of extra transport elements in contact with the tape oxide surface helps minimize oxide wear and thus prolongs tape life. It is also to be noted that the BOT/EOT sensor 28 has been omitted from FIGS. 2 and 3 in the interest of facilitating understanding of the present invention. The tape pack and elements described above are known in the art.

Of course, if reel 12 is functioning as the supply reel and reel 10 is the take up reel, the path for recording tape 14 will be the reverse of that described above.

The path for the endless peripheral driving belt 22 (in the forward direction), which is preferably a seamless plastic film material such as a polyimide film such as Kapton or a polyester film such as Mylar (e.g. non-elastic plastic films), is about part of the periphery of the tape pack on reel 10 about a first rotary brake 32(b), around an idler roller 35, around a belt tensioning idler roller 34, about an idler 33, about a second rotary brake 32(a), around a portion of the periphery of the tape pack on reel 12, about a capstan 18 and back to its starting point on the tape pack on reel 10. Brakes 32(a) and 32(b) are magnetic hysteresis brakes known in the art, but they could also be friction brakes. The belt tensioning idler roller 34 is rotatably mounted on a shaft on a first end of a spring-loaded arm 36, and a counterweight 38 is mounted on the opposite end of arm 36. Arm 36 is mounted on a rotatable shaft 37 which is mounted in bearings in housing 39 in base 11. The spring for tensioning arm 36 is indicated at 40. Spring 40 is a torsion spring which has one end grounded at post 42 to base 11 and the other end of spring 40 attached to a post 44 on arm 36, and the boy of spring 40 is coiled around housing 39. Spring 40 serves to maintain a substantially constant tension on belt 22 as the tape 14 travels from beginning of tape to end of tape by urging arm 36 and idler roller 34 in the direction to impose a tension load on belt 22. The counterweight 38 serves to dynamically balance arm 36 to prevent variations in the tension of belt 22 which would otherwise result from vibration forces to which the tape transport unit is subjected. The direction of travel of belt 22 will be from whichever tape reel is the supply reel, across the dual brakes and idler/pulley system, to the take up reel.

The capstan 18 is driven by motor 16 via drive belt 20. Drive motor speed may be controlled in the conventional manner, using feedback from a tachometer mounted on the capstan. The direction of rotation of the motor and capstan and drive belt will depend on which reel is to function as the supply reel and which the take up reel. Tape driving power is transmitted from capstan 18 to the peripheral drive belt 22 and from belt 22 to the outermost layer of the tape 14 on each of reels 10 and 12. Power transmission is effected through the normal static frictional forces existing at the belt-capstan interface and at the belt-tape interfaces. The peripheral belt 22 is maintained under adequate tension at all times by means of the spring-loaded belt tensioning arm 36 and the roller 34 mounted thereon. The spring-loaded belt tensioning arm and associated roller also serve to compensate for small changes in the total linear distance around the belt path which occur with changing disposition of the total tape footage between the two reels. The belt-capstan and belt-tape interfacial friction forces are adequate to drive the tape without significant slippage, even during rapid start-stop operation.

Figure 4:
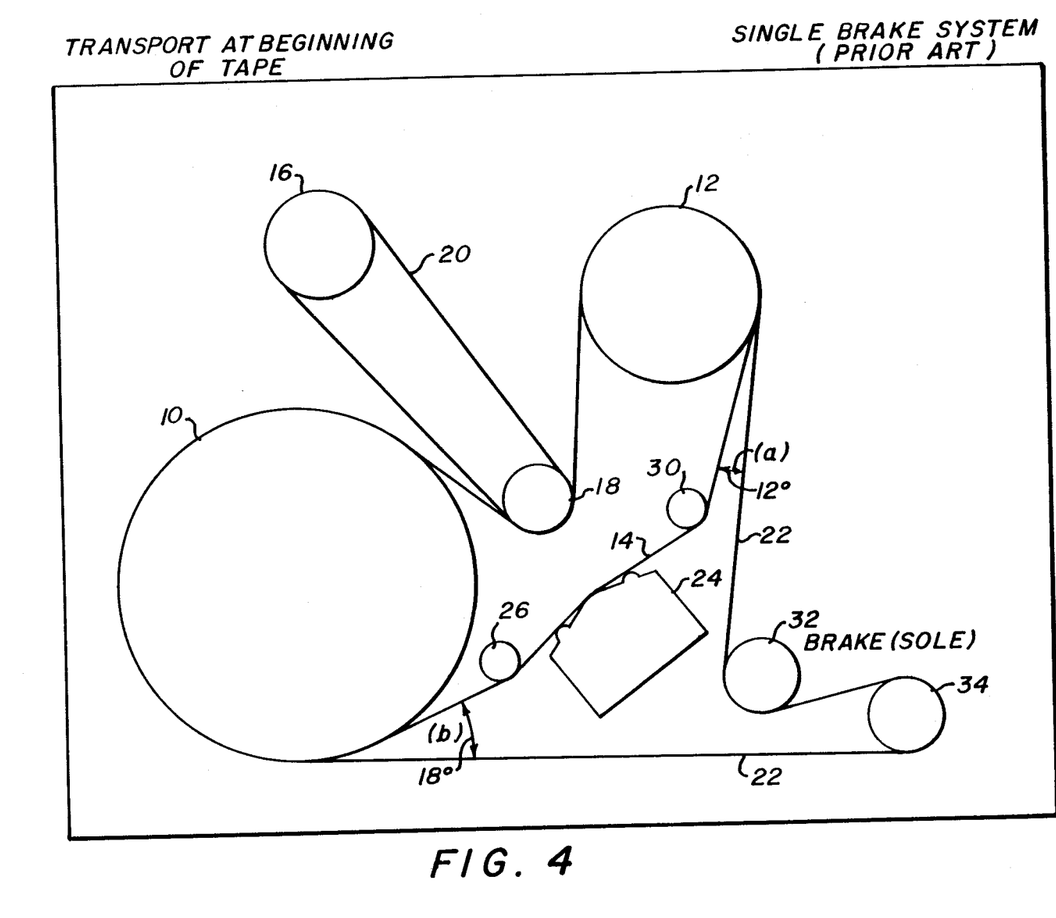
FIGS. 4 and 5 show schematic representations of the prior art single brake tape transport at beginning of tape and end of tape modes, respectively.
Figure 5:
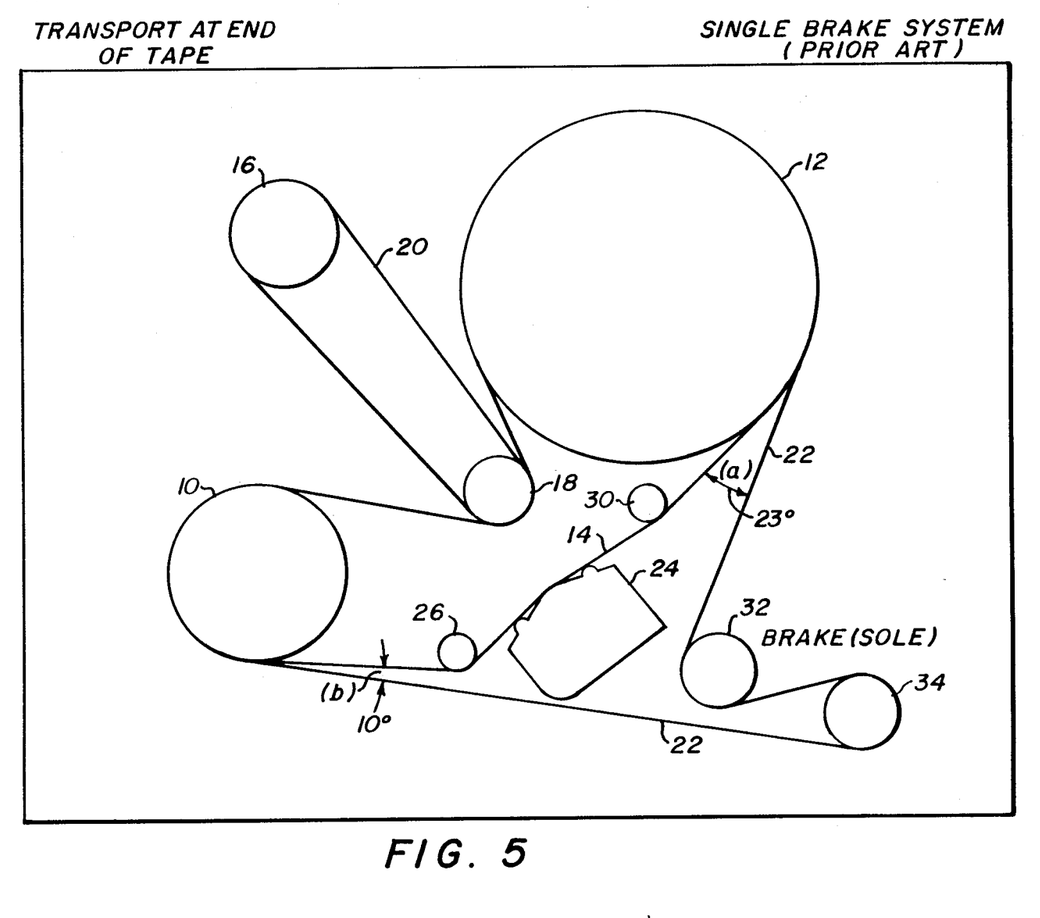

A comparison of FIGS. 1 and 2 hereof with FIGS. 1 and 3 of U.S. Pat. No. 4,455,001 shows that this invention differs from the structure shown in FIG. 1 of U.S. Pat. No. 4,455,001 by: (1) the inclusion of a pair of rotary brakes 32(a) and 32(b), rather than the single rotary brake of the prior patent; (2) the location of the rotary brakes 32(a) and 32(b) adjacent the tape reels at locations to increase the separation of the drive belt 22 from the tape on reels 10 and 12 and to increase the angles (a) and (b) at which the drive belt contacts the tape pack on each reel (as compared to the prior art angles of U.S. Pat. No. 4,455,001 which are shown in FIGS. 4 and 5); (3) by the inclusion of idler 35 which serves to establish a desired angle of wrap around brake 32(b); and (4) by the inclusion of idler 33 at the location where the brake was placed in the prior patent.

The use of dual rotary brakes, i.e., brakes 32(a) and 32(b) and their locations relative to the tape reels 10 and 12 are the critical features of the present invention. The presence and location of the two rotary brakes 32(a) and 32(b) results in a lower average tension on the magnetic tape 14 from BOT to EOT, and it also results in significantly lower tape tension at the beginning of the tape and at the end of the tape. The lower average tape tension and the lower tension levels at the beginning and end of the tape enhance and improve tape life, because high tension is detrimental to tape life; and these lower tension levels also lead to several other important advantages which will be discussed hereinafter.

It is well known in tape transport systems to set the torque of a single rotary brake to obtain a desired tape tension to produce optimum tape/head interface pressure In the system of the present invention, the total torque of the two brakes is equal to or slightly less than the torque requireed for a single brake, that brake torque is divided approximately equally between the two brakes so that the torque level of each of the two brakes is equal to or less than one half that of a single brake.

Figure 6:
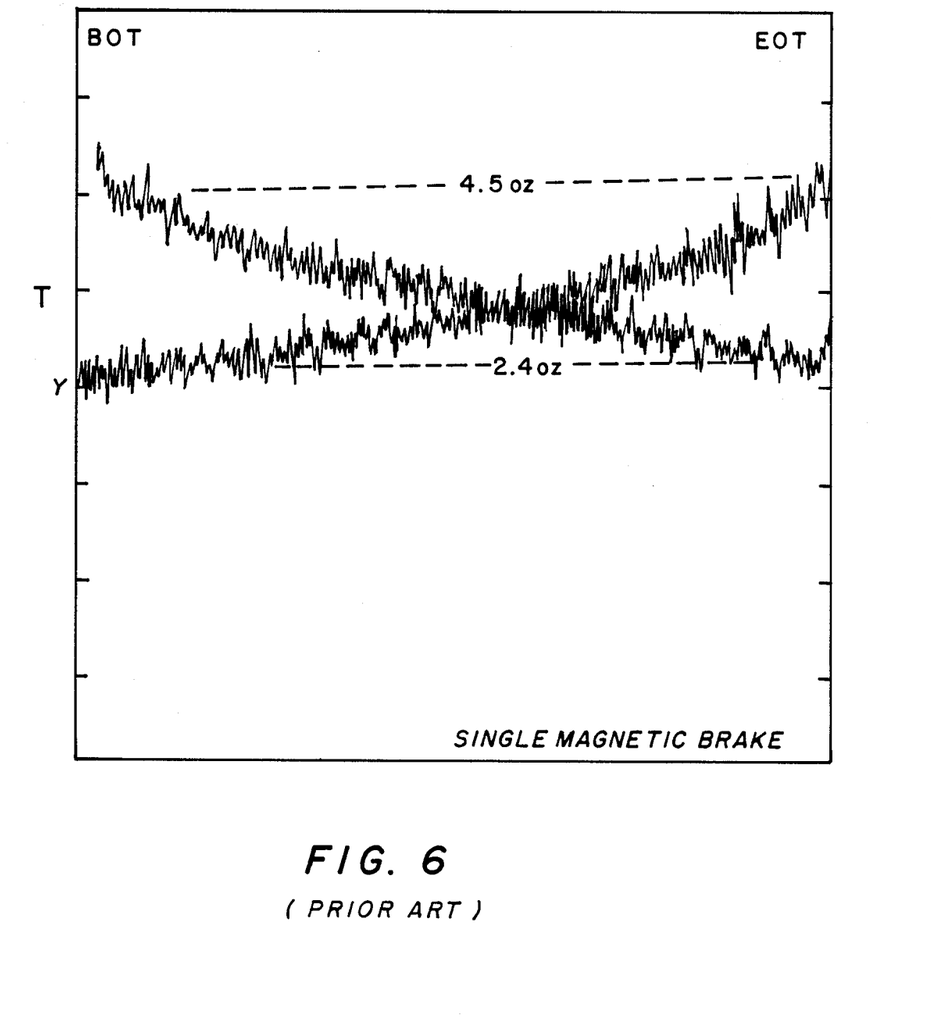
FIG. 6 is a graph illustrating a typical tape tension curve for a typical prior art tape transport system.
Figure 7:
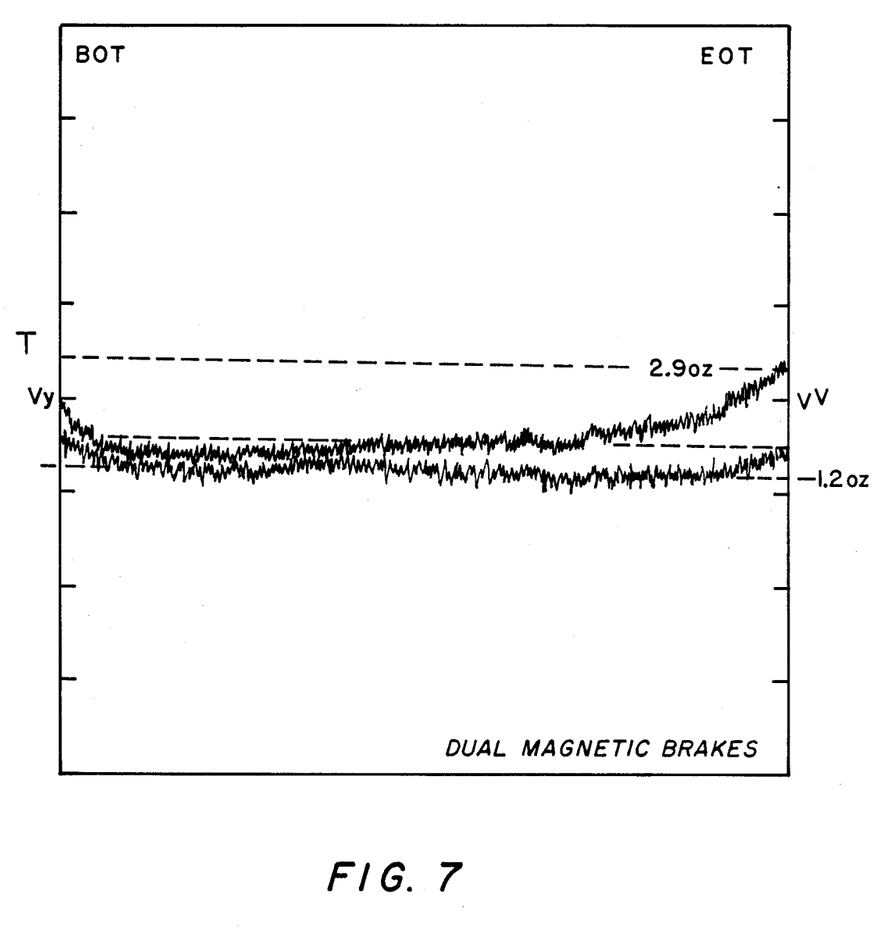
FIG. 7 is a graph showing an improved typical tape tension curve for a tape transport system of the present invention.

Referring to FIGS. 6 and 7, graphs are presented which show typical tension curves for belt driven tape transports based, respectively, on the prior art and this invention, where the transports are used for the same application, and operated under the same conditions, and using the same tape and tape reels. FIG. 6 shows tape tension T versus tape travel from BOT to EOT It is to be noted that tape tension varies from about 2.4 oz. to 4.5 oz., with significant increases in tension occurring as the tape approaches the BOT or EOT. FIG. 6 depicts a tension pattern well known in the art and which is often referred to as a "butterfly" or "bowtie" curve or pattern. In the system which is charted in FIG. 3, the required tension is 2.4 oz.; and tension above 2.4 oz. for the duration of time from BOT to EOT represents both a power drain and excessive wear on the tape.

Referring to FIG. 7, tension curves are shown for a system comparable to that on which FIG. 6 was based, but employing the dual brake configuration of the present invention. As can be seen, the absolute levels of tension are much lower, ranging from 1.2 oz. to 2.9 oz.; and the curves are much flatter and closer together, which means that the average tape tension from BOT to EOT is lower and approaches the absolute minimum needed for proper operation of the system.

Because of the lower average and absolute values of tape tension obtained by the present invention, as illustrated in FIG. 7, tape life is increased, and distortion of tape, particularly at the beginning and end of the tape travel, is reduced or eliminated. Also, lower average tape tension results in lower wear of read/write head 24 and reduces the wearing off of particles from the head which can contaminate the tape and/or the transport system; lower power is required to drive the unit (i.e., the unit is more efficient), because the prior art power drain is reduced; and tape transfer from reel to reel is enhanced because of the more even interface between tape and the read/write head.

The advantages realized from the dual brake system of the present invention are unexpected and unobvious. While the operation of the present invention and the explanation for achievement of its several important advantages are not fully understood, a theory has been developed which may offer an explanation. However, it is to be understood that this theory is only the best present understanding, and it may not be correct or accurate; and the invention is not bound to or limited by this theory. The two brakes 32(a) and 32(b) are positioned to maximize the angles (a) and (b) at which the drive belt 22 contacts the tape packs This means that the separation of the drive belt from the tape is increased (as compared to the prior art single brake system of U.S. Pat. Nos. 3,620,473, 3,974,982 and 4,555,001) where the tape enters or leaves the tape pack (which is an area where the tape is loosest on the tape pack and where slippage between the drive belt and the tape can occur most easily), and the contact between the drive belt 22 and the tape packs is concentrated at the rear of the tape pack, i.e., at the area of maximum interlayer pressure of the tape pack. This results in a system in which more tape mass is being driven by the belt, and it generates a more constant instantaneous linear velocity of the tape packs. This is distinguished from the prior art systems in which the drive belt contacts the tape pack at a lower angle which results in a tendency to drive just the first few layers of tape (i.e., driving lower tape mass), which results in uneven tape tension as the tape is being wound up. Tape tension is established by establishing a slight differential instantaneous linear velocity between the tape exiting the pay-out reel and the tape entering the take up reel, with the take-up reel operating at a slightly greater velocity than the pay-out reel. It is known in the art to establish this differential instantaneous velocity by a brake in the path of the drive belt. The use in the present invention of dual brakes to establish this differential instantaneous velocity, and the placement of the dual brakes to increase the angles (a) and (b) is believed to establish a symmetrical load on the belt path which, in turn, results in a more constant differential instantaneous tape velocity in the system. And, it is believed that the more constant differential instantaneous velocity results in a more constant average tape tension, and lower absolute tape tension, particularly in the BOT and EOT regions, thus leading to the several unexpected advantages of this invention.

By way of example, as seen in FIGS. 2 and 3, in the present invention the angles (a) varies from a minimum of 30° to a maximum of 33.5° and the angle (b) varies from a minimum 20° to a maximum of 35° as the tape goes from initially being all on reel 12 to being all on reel 10. By way of contrast, in a prior art single brake system using the same tape packs, angle (a) varies from a minimum of 12° to a maximum of 23° and angle (b) varies from a minimum of 10° to a maximum of 18° as the tape goes from initially being all on reel 12 to being all on reel 10. It is believe that the angular relationship of the present invention wherein both angles (a) and (b) are always at least 20° contributes to the improved results of the present invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A tape transport including:
    a base for mounting tape transport elements;
    first tape transport means rotatably mounted on said base;
    second tape transport means rotatably mounted on said base;
    magnetic tape means forming tape packs on each of said tape transport means and extending between said tape transport means for the transfer of tape between said tape transport means;
    drive belt means for contacting the periphery of said tape packs on each of said first and second tape transport means to transfer tape between said first and second tape transport means;
    drive means for driving said drive belt means;
    first rotary brake means adjacent said first tape transport means and in contact with said drive belt means adjacent said first tape transport means;
    second rotary brake means adjacent said second tape transport means and in contact with said drive belt means adjacent said second tape transport means;
    said first brake means being positioned relative to said first tape transport means to establish a first predetermined angular relationship between said drive belt means and the tape on said first tape transport means;
    said second brake means being positioned relative to said second tape transport means to establish a second predetermined angular relationship between said drive belt means and the tape on said second tape transport means;
    belt tensioning roller means for maintaining said drive belt means under a pre-selected tension;
    first idler means being positioned between said belt tensioning roller means an said first brake means for maintaining a pre-selected angle of wrap of said drive belt means about said first brake means; and
    second idler means being positioned between said belt tensioning roller means and said second brake means for maintaining a pre-selected angle of wrap of said drive belt means about said second brake means.

2. A tape transport according to claim 1, wherein:
    said first brake means, said second brake means and said drive belt means interact to establish a tension in said tape means between said first and second tape transport means which varies minimally over the major part of the travel of said tape means between said first and second tape transport means.

3. A tape transport according to claim 1 wherein:
    said first brake means, said second brake means and said drive belt means interact to establish a substantially constant tension in said tape means between said first and second tape transport means over the major part of the travel of said tape means between said first and second tape transport means 4. A tape transport according to claim 1 wherein:
    said first brake means is positioned to concentrate the area of contact of said drive belt means with the tape on said first tape transport means in the area of maximum interlayer pressure of said tape on said first tape transport means;
    said second brake means is positioned to concentrate the area of contact of said drive belt means with the tape on said second tape transport means in the area of maximum interlayer pressure.

5. A tape transport according to claim 1, wherein:
    said first brake means and said second brake means are positioned to establish an angle of at least 20° between said drive belt means and the tape on said first and second tape transport means.

6. A tape transport according to claim 1 wherein:
said first brake means is positioned relative to said first tape transport means to establish an angle of between about 30° and about 33.5° and said second brake means is positioned relative to said second tape transport means to establish an angle of between about 35° and 20° as said tape travels between said first and second tape transport means.

7. A tape transport according to claim 1 wherein: the torque of said first and second brake means is set to be approximately equal.

8. A tape transport according to claim 1 wherein:
the total brake torque is selected to establish a predetermined desired tape tension and to establish a predetermined pressure between said tape and a read/write head, and the torque setting of each of said first and second brake means is equal to or less than one half said total brake torque.

9. A tape transport according to claim 1 wherein:
said drive belt means is a non-elastic plastic film.

10. A tape transport according to claim 9 wherein:
said plastic film is selected from the group comprising polyimide or polyester.

11. A tape transport including:
a base for mounting tape transport elements;
first tape transport means rotatably mounted on said base;
magnetic tape means on forming tape packs on each of said tape transport means and extending between said tape transport means for the transfer of tape between said first and second tape transport means;
drive belt means for contacting the periphery of said tape packs on each of said first and second tape transport means to transfer tape between said first and second tape transport means;
drive means for driving said drive belt means;
first rotary brake means adjacent said first tape transport means and in contact with said drive belt means adjacent said first tape transport means;
second rotary brake means adjacent said second tape transport means and in contact with said drive belt means adjacent said second tape transport means;
said first brake means being positioned relative to said first tape transport means to establish a first predetermined angular relationship between said drive belt means and the tape on said second tape transport means;
belt tensioning roller means for maintaining said drive belt means under a pre-selected tension; and
first idler means being positioned between said belt tensioning roller means and said first brake means for maintaining a pre-selected angle of wrap of said drive belt means about said first brake means.

12. A tape transport according to claim 11 wherein:
said first brake means, said second brake means and said drive belt means interact to establish a tension in said tape means between said first and second tape transport means which varies minimally over the major part of the travel of said tape means between said first and second tape transport means.

13. A tape transport according to claim 11 wherein:
said first brake means, said second brake means and said drive belt means interact to establish a substantially constant tension in said tape means between said first and second tape transport means over the major part of the travel of said tape means between said first and second tape transport means.

14. A tape transport according to claim 11 wherein:
said first brake means is positioned to concentrate the area of contact of said drive belt means with the tape on said first tape transport means in the area of maximum interlayer pressure of said tape on said first tape transport means; and
said second brake means is positioned to concentrate the area of contact of said drive belt means with the tape on said second tape transport means in the area of maximum interlayer pressure.

15. A tape transport according to claim 11 wherein:
said first brake means and said second brake means are positioned to establish an angle of at least 20° between said drive belt means and the tape on said first and second tape transport means.

16. A tape transport according to claim 11 wherein:
said first brake means is positioned relative to said first tape transport means to establish an angle of between about 30° and about 33.5° and said second brake means is positioned relative to said second tape transport means to establish an angle of between about 30° and 20° as said tape travels between said first and second tape transport means.

17. A tape transport according to claim 11 wherein:
the torque of said first and second brake means is set to be approximately equal.

18. A tape transport according to claim 11 wherein:
the total brake torque is selected to establish a predetermined desired tape tension and to establish a predetermined pressure between said tape and a read/write head, and the torque setting of each of said first and second brake means is equal to or less than one half said total brake torque.

19. A tape transport according to claim 11 wherein:
said drive belt means is a non-elastic plastic film.

20. A tape transport according to claim 19 wherein:
said plastic film is selected from the group comprising polyimide or polyester.

21. A tape transport according to claim 11 including:
second idler means being positioned between said belt tensioning roller means and said second brake means for maintaining a pre-selected angle of wrap of said drive belt means about said second brake means.

* * * * *